(12) United States Patent
Pigeon et al.

(10) Patent No.: US 9,071,580 B2
(45) Date of Patent: Jun. 30, 2015

(54) METHOD AND SYSTEM FOR SECURING DATA OF A MOBILE COMMUNICATIONS DEVICE

(75) Inventors: Nicole Pigeon, Pelham, NH (US); Van Quy Tu, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/224,863

(22) Filed: Sep. 2, 2011

(65) Prior Publication Data

US 2012/0110345 A1 May 3, 2012

Related U.S. Application Data

(60) Provisional application No. 61/408,882, filed on Nov. 1, 2010.

(51) Int. Cl.
| | |
|---|---|
| *H04L 29/06* | (2006.01) |
| *H04W 12/02* | (2009.01) |
| *G06F 21/62* | (2013.01) |
| *G06F 21/60* | (2013.01) |

(52) U.S. Cl.
CPC ........... *H04L 63/0435* (2013.01); *H04L 63/101* (2013.01); *H04W 12/02* (2013.01); *G06F 21/6218* (2013.01); *G06F 21/602* (2013.01); *G06F 2221/033* (2013.01); *G06F 2221/2115* (2013.01); *G06F 2221/2107* (2013.01)

(58) Field of Classification Search
CPC . H04L 63/0435; H04L 63/101; H04W 12/02; G06F 21/602; G06F 21/6218; G06F 2221/2115; G06F 2221/2107; G06F 2221/033
USPC .......... 713/150–181, 189, 193; 380/255–286; 726/26, 29
See application file for complete search history.

(56) References Cited

U.S. PATENT DOCUMENTS

| | | | | |
|---|---|---|---|---|
| 7,430,671 | B2 * | 9/2008 | Graves et al. ................. | 713/193 |
| 2005/0223222 | A1 * | 10/2005 | Graves et al. ................. | 713/165 |
| 2005/0246553 | A1 * | 11/2005 | Nakamura et al. ............ | 713/193 |
| 2006/0190724 | A1 * | 8/2006 | Adams et al. ................. | 713/166 |
| 2006/0236090 | A1 * | 10/2006 | Birum et al. .................. | 713/150 |

(Continued)

FOREIGN PATENT DOCUMENTS

EP   1501330 A2   1/2005

OTHER PUBLICATIONS

Extended European Search report mailed Apr. 3, 2012, in corresponding application No. 11179838.5.

(Continued)

*Primary Examiner* — Chau Le
*Assistant Examiner* — Don Zhao
(74) *Attorney, Agent, or Firm* — Fish & Richardson P.C.

(57) ABSTRACT

A method and system for securing data of a mobile communications device. The method includes: determining that first application data is data associated with a first server; encrypting the first application data with an encryption key stored in the mobile communications device; storing the encrypted first application data on a memory; receiving a request to access the first application data from an application or a service implemented from the mobile communications device; determining that the application or service is authorized to access the first application data; and in response to said determining, decrypting the first application data with the encryption key.

28 Claims, 4 Drawing Sheets

(56) References Cited

U.S. PATENT DOCUMENTS

| | | | |
|---|---|---|---|
| 2006/0242431 A1* | 10/2006 | LeCrone et al. | 713/193 |
| 2007/0297610 A1 | 12/2007 | Chen et al. | |
| 2008/0034205 A1* | 2/2008 | Alain et al. | 713/160 |
| 2008/0134347 A1* | 6/2008 | Goyal et al. | 726/29 |
| 2008/0310633 A1* | 12/2008 | Brown et al. | 380/259 |
| 2008/0313707 A1* | 12/2008 | Jain et al. | 726/2 |
| 2009/0132813 A1* | 5/2009 | Schibuk | 713/158 |
| 2010/0174919 A1* | 7/2010 | Ito et al. | 713/192 |
| 2011/0107427 A1* | 5/2011 | Cohen et al. | 726/26 |

OTHER PUBLICATIONS

Michael Austin Halcrow: Demands, Solutions, and improvements for Linux Filesystem Security, proceedings of the Linux Symposium, vol. 1 Jul. 21, 2004, Jul. 24, 2004, pp. 269-286, XP002671951, Ottawa, Ontario, Canada Retrieved from the internet: URL:http://www.qbang.org-ols2004/ols-1.pdf retrieved on Mar. 20, 2012 section 2.1-section 6.

Shabtai A, et al. Google Android: A Comprehensive Security Assessment IEEE Security and Privacy, IEEE Computer Society, New York, NY, US, vol. 8, No. 2, Mar. 1, 2010, pp. 35-44, XP011335538, ISSN: 1540-7993, DOI: 10.1109/MSP.2010.2, p. 2, left-hand colum, line 22—p. 4, left-hand colum, line 10; table 1.

Examination report mailed Jan. 3, 2013, in corresponding European patent application No. 11179838.5.

Office Action mailed Aug. 20, 2013, in corresponding Canadian patent application No. 2,756,523.

Intention to Grant mailed May 23, 2013, in corresponding European patent application No. 11179838.5.

Is Data Is, or Is Data Ain't, a Plural?—Real Time Economics—WSJ—Real Time Economics; Economic insight and analysis from the Wall Street Journal; http://blogs.wsj.com/economics/2012/07/05/is-data-is-or-is-data-aint-a-plural/; published Jul. 5, 2012 and retrieved on Jul. 16, 2013.

Securing Your BlackBerry; Protecting Your BlackBerry 4 Steps to Securing the Data on Your Handheld by William Deutsch; http://bizsecurity.about.com/od/informationsecurity/a/blkberry.htm, published at least as early as Mar. 2009.

* cited by examiner

METHOD AND SYSTEM FOR SECURING DATA OF A MOBILE COMMUNICATIONS DEVICE

CROSS-REFERENCE TO RELATED APPLICATION

This application claims priority to U.S. Provisional Application No. 61/408,882 filed Nov. 1, 2010, which is incorporated by reference herein in its entirety.

TECHNICAL FIELD

Example embodiments relate to the field of file management, and more specifically to the field of file management for mobile devices.

BACKGROUND

With the prevalence of portable communications devices such as smart phones and handheld computers, users are increasingly able to receive and access data from networked servers. In this environment, enterprises, groups and individuals may wish to secure data transferred and stored on a communication device.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION OF EXAMPLE EMBODIMENTS

In accordance with one aspect, there is provided a method of securing data of a mobile communications device. The method includes determining that first application data is data associated with a first server; encrypting the first application data with an encryption key stored in the mobile communications device; storing the encrypted first application data on a memory; receiving a request to access the first application data from an application or a service implemented from the mobile communications device; determining that the application or service is authorized to access the first application data; and in response to said determining, decrypting the first application data with the encryption key.

In accordance with another aspect, there is provided a mobile communications device. The mobile communications device includes a processor; memory; and a communication subsystem for sending and receiving communications with a server. The processor is configured for determining that application data is data associated with the server, encrypting the application data with an encryption key stored in the mobile communications device, storing the encrypted application data in the memory, receiving a request to access the encrypted application data by an application or a service implemented from the processor, determining that the application or service is authorized to access the encrypted application data, and in response to said determining, decrypting the application data.

In accordance with yet another aspect, there is provided a non-transitory computer readable medium having instructions stored thereon for securing data of a mobile communications device, the instructions comprising instructions for: determining that first application data is data associated with a first server; encrypting the first application data with an encryption key stored in the mobile communications device; storing the encrypted first application data on a memory; receiving a request to access the first application data from an application or a service implemented from the mobile communications device; determining that the application or service is authorized to access the first application data; and in response to said determining, decrypting the first application data with the encryption key.

Figure 1:
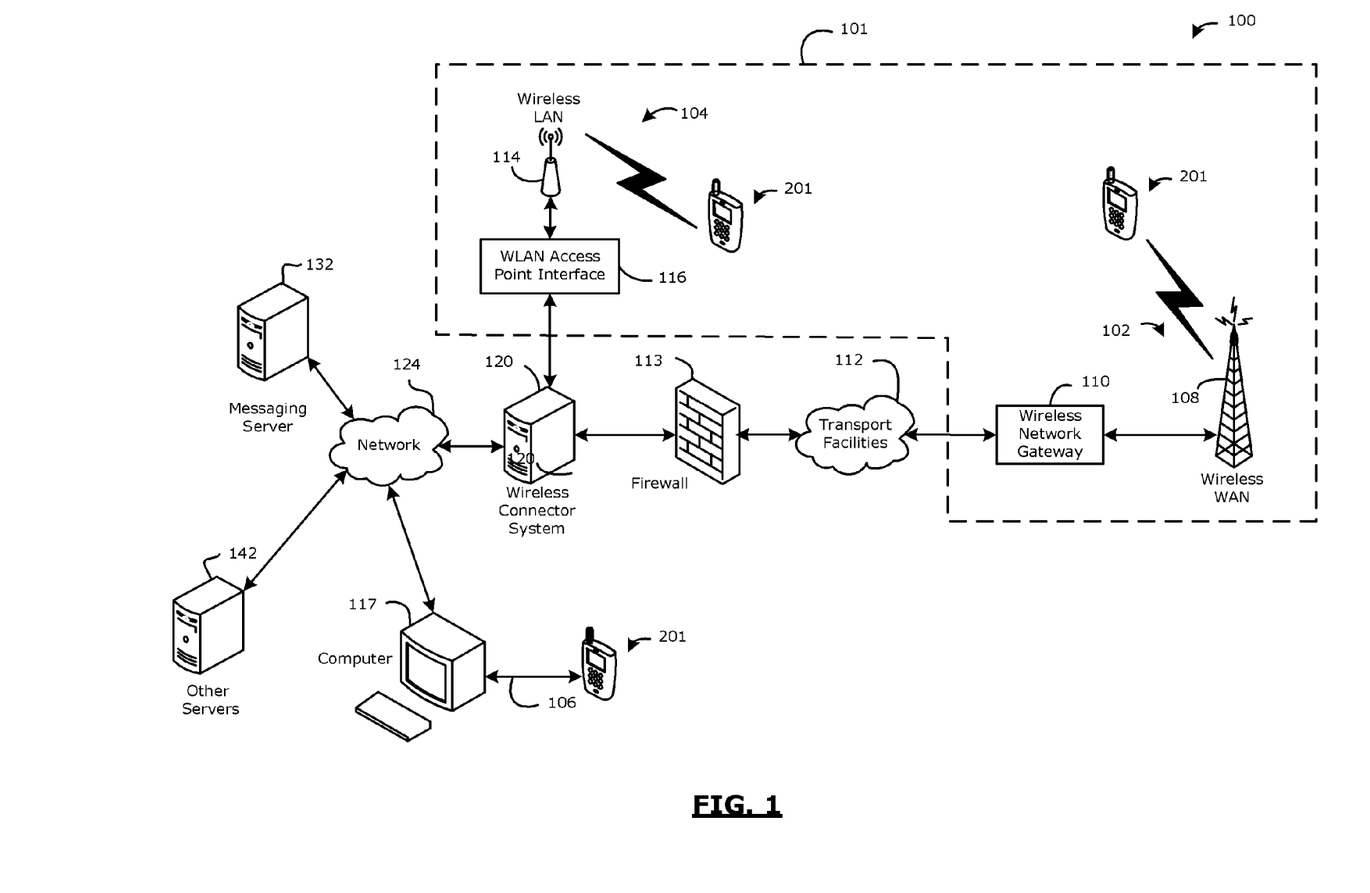
FIG. 1 is a block diagram of a communications system to which embodiments may be applied.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) and optionally other servers 142. The other servers 142 may comprise a content server for providing content such as internet content or content from an organization's internal servers to the mobile communication devices 201 in the wireless network 101, an application server for implementing server-based applications such as instant messaging (IM) applications, or a web server for providing content accessible by a web browser.

For the purposes of the described example embodiments, any server within an enterprise network, such as a messaging server or any other server, will be referred to as an enterprise server. A service may include one or more servers or enterprise servers.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

Encryption keys used for communications or for encrypting data stored on the device can be protected via various means such as a password or hardware-based protections, such as those afforded by hardware-based key stored mechanisms.

The wireless network gateway 110 is adapted to send data packets received from the mobile device 201 over the WWAN 102 to the wireless connector system 120. The wireless connector system 120 then sends the data packets to the appropriate connection point such as the messaging server 132, or other servers 142. Conversely, the wireless connector system 120 sends data packets received, for example, from the messaging server 132, or other servers 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, or other servers 142.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
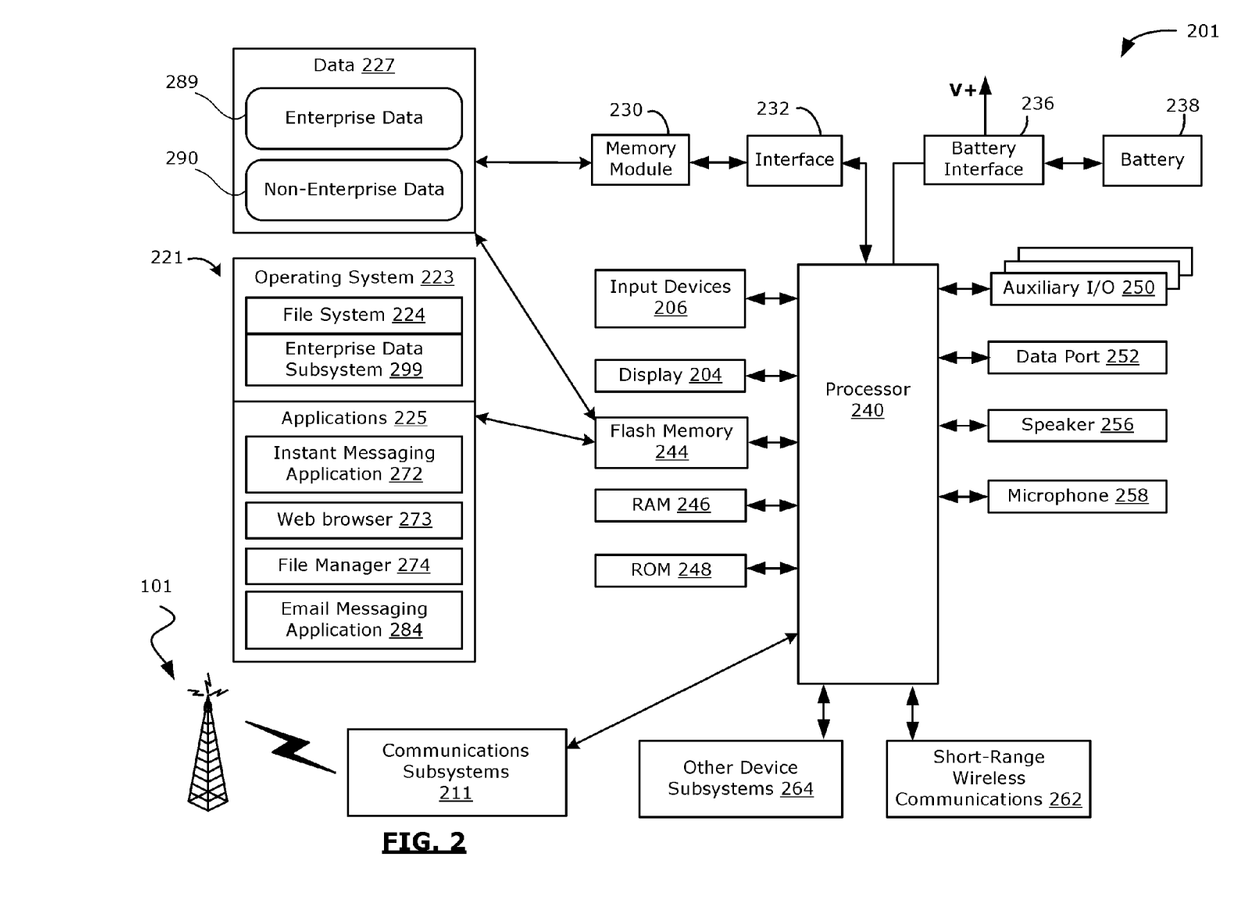
FIG. 2 is a block diagram showing an example of a mobile device that can be used in the communications system of FIG. 1.

Reference is now made to FIG. 2 which illustrates a mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The mobile device 201 may communicate with any one of a plurality of fixed transceiver base stations 108 (FIG. 1) of the wireless network 101 within its geographic coverage area. The mobile device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223 and software applications 225, which for example, may include a text or instant messaging application 272, a web browser 273, a file manager application 274, and an email messaging application 284. In some example embodiments, the functions performed by each of the applications 272, 273, 274, and 284 may each be realized as a plurality of independent elements, and any one or more of these elements may be implemented as parts of other software applications 225. In some example embodiments, one or more applications 225 are configured to receive data, such as files, documents or other information, from a server, such as a messaging server 132 (FIG. 1), or a web or other server 142 (FIG. 1). Non-limiting examples of data received from a server may include email attachments, files transferred via file transfer protocol (FTP) or any other protocol, documents or files downloaded from a web page via a web browser, or files sent via a text or instant messaging application.

In some examples, the software applications 225 may be implemented using a number of services which define the communication protocols used to communicate between a server and an application on the communication device. Some applications may only connect to a single type of server using the same communication protocol settings and will therefore only operate using a single service, while other applications may connect to a variety of servers using different communication protocols and will require multiple services. For example, a banking application on a communication device may only require a single service defining the communication protocol for securely communicating with the bank's online banking server, while a web browser may require many different services such as services for general web page browsing, for secure web page browsing, for streaming video, for accessing corporate web email, or for accessing online public email services.

For illustration purposes, FIG. 2 shows a file system module 224 as a component of the operating system 223. In some example embodiments, the file system module 224 may perform common file system functions including managing the storage, organization and access of data in memory on the communications device.

In some example embodiments, the file system module 224 may include an enterprise data subsystem 299. This enterprise data subsystem module 299 may be responsible for managing enterprise data in conjunction with the file system 299. In some examples, the enterprise data subsystem 299 may be a component of the file system module 224 or may be a separate component of the operating system 223. While illustrated as a part of the operating system 223 in FIG. 2, in other examples, the enterprises data subsystem 299 may be a separate application that is separate from the operating system 223. In the example in FIG. 2, the enterprise data subsystem 299 is illustrated as a separate module; however, in other examples, the functions carried out by the enterprise data subsystem may not be distinct but instead may be executed by the file system 224, other operating system components, other applications 225, or any combination thereof. In example embodiments, the file system module 224 may implement or include at least some of the file manager 274.

The enterprise data subsystem 299 will control all access to enterprise data 289, and any software module 221 or parts thereof attempting to access enterprise data 289 will access the data via the enterprise data subsystem 299.

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 includes a removable memory card 230 (typically comprising flash memory) and a memory card interface 232. The mobile device 201 can store data 227 on the removable memory card 230, in an erasable persistent memory, which in one example embodiment is the flash memory 244, or on both a removable memory card and in an erasable persistent memory.

In various embodiments, the data 227 includes service data comprising information required by the mobile device 201 to establish and maintain communication with the wireless network 101. The data 227 may also include user application data such as email messages, address book and contact information, calendar and schedule information, word processor documents, spreadsheets, presentation slides, image files, audio and video files and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The data 227 stored in memory (e.g. removable memory card 230 or resident persistent memory such as flash memory 244) may be classified as enterprise data 289 or non-enterprise data 290. In some examples, enterprise data may include any type of data that may be sensitive in nature, or data to which an enterprise may wish to prevent unauthorized access. In some examples, all data received from an enterprise server may be classified as enterprise data, and all other data may be classified as non-enterprise data.

In other examples, specific data received and flagged by an enterprise server is classified as enterprise data, and any data not flagged or not received from an enterprise server is classified as non-enterprise data. By flagging or identifying specific data as enterprise data, the enterprise server can distinguish between data for which the server requires a higher level of security, and data for which the server does not require a higher level of security.

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

A difficulty with some conventional existing mobile devices is that the owner or user of the device is presumed to have access to all of the stored files. Once unlocked, the mobile device may thereafter permit access to all of the stored files, whether in resident memory or in a removable media card.

In another example of such conventional devices, so long as an application or service provides some "ciphertext" (any encrypted text), the device will attempt to decrypt the data and return the resulting data or plaintext. Such devices may not be aware of or consider the source of the ciphertext. The device or application may always attempt to decrypt the ciphertext, and if possible, return the result. Such systems can result in unnecessary processing from the device. For example, some conventional systems may attempt to decrypt large media files.

Figure 3:
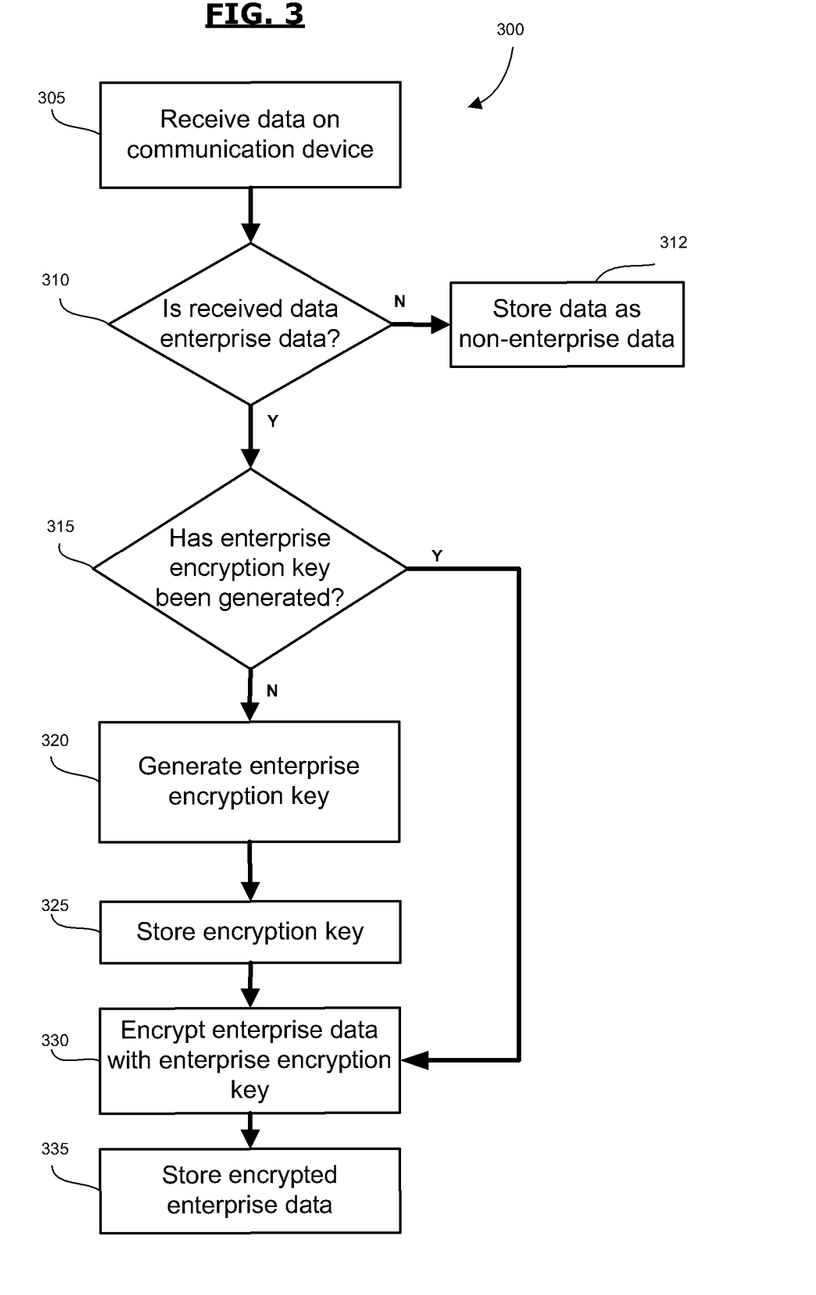
FIG. 3 shows, in flowchart form, an example method for securing data of a communications device.

Reference is now made to FIG. 3, which shows, in flowchart form, a method 300 of securing data of a communications device. The method 300 begins at event 305 with the communication device receiving data via any communication or data interface. In other example embodiments, the method 300 begins with the sending of data (e.g. sending an email to another user via an email server associated with an enterprise). In yet further embodiments, the method 300 can be triggered by the installation or removal of an application or file manager application 274, in which case the method 300 may be performed on data which is already stored within the device. In some example embodiments, at least some aspects of the method 300 may be implemented by the file manager application 274. In other example embodiments, the method 300 begins with the receiving of data (e.g. receiving an email from an email server associated with an enterprise).

At event 310, the communication device determines whether the received data is associated with a particular service or server, for example, enterprise data versus non-enterprise data. In one example, the communication device will classify or identify any data received from an enterprise server as enterprise data. This may be determined by the source of the data. For example, if the data is received via a secured enterprise network connection or is indicated to have been sent by an enterprise server in a protocol header, the communication device will classify the data as enterprise data. All other data, such as data received from a non-enterprise server or via a non-enterprise network connection, will be classified as non-enterprise data. Accordingly, in some example embodiments some but not all of the stored data may be selectively designated as being enterprise data.

In another example, the communication device will classify data as enterprise or non-enterprise data depending on metadata associated with the data. For example, an indicator indicating that the data is enterprise data may be generated and stored in a file header, or in any other metadata associated with a file.

If the data is determined to be non-enterprise data, at event 312, the data is stored as non-enterprise data. Depending on the communication device and device security settings, non-enterprise data may or may not be encrypted. Examples of non-enterprise data may include individual data or personal data which is independent of any work data.

If the data is determined to be enterprise data at event 310, the communication device, at event 315 determines whether an enterprise encryption key has already been generated. If so, the method continues with event 330 wherein the enterprise data is encrypted with a previously generated encryption key.

If an enterprise encryption key has not been generated, the communication device generates an enterprise encryption key at event 320 to be used to encrypt the enterprise data. In some examples, the enterprise encryption key is generated using a random or pseudorandom number generator. In other examples, the enterprise encryption key is generated using a hash function. The hash function may generate the enterprise encryption key using any combination of inputs including but not limited to a username, a device password, an enterprise identifier, and a clock time. For security purposes, the enterprise encryption key should be device specific so the hash function generally should not generate the same encryption key on different devices. In example embodiments, the key is unknown to the enterprise server.

At event 325, the enterprise encryption key is stored in a non-volatile memory 244 on the communication device. The key may be stored in a key store or any protected file or region of the memory to prevent unauthorized access.

At event 330, the enterprise data is encrypted using the enterprise encryption key. The data may be encrypted using any encryption algorithm including but not limited to the Triple Data Encryption Algorithm (Triple DES), and the Advanced Encryption Standard (AES).

At event 335, the encrypted enterprise data is stored in the non-volatile memory 244 or the removable memory card 230. In one example, the encrypted enterprise data is stored with a generated header, file extension, and/or other metadata indicating that the data is enterprise data. The header information may include a signature, for example a 4 byte signature. In another example, the enterprise data subsystem may keep track of which stored data is classified as enterprise data in a list, database, catalog file, or in any other format that is stored separately from the actual enterprise data. In example embodiments, it can be appreciated that when the removable memory card 230 is removed, the enterprise encryption key can remain resident on the non-volatile memory 244, rendering any encrypted data resident on the removable memory card 230 inaccessible without being attached to the device.

In some examples, the communication device uses the same encryption key to encrypt all enterprise data received from the same enterprise. In these examples, upon receiving the first enterprise data from the enterprise, an enterprise encryption key is generated to encrypt the first enterprise data and the same enterprise encryption key is used to encrypt all subsequently received enterprise data.

In other examples, the communication device uses different encryption keys for each subsequently received enterprise data. In these examples, event 315 is skipped, and a new enterprise encryption key is generated with each receipt of enterprise data.

In some examples, the communication device may be configured to communicate with more than one enterprise. In these examples, the communication device is configured to generate and use a unique enterprise encryption key for each enterprise from which it receives enterprise data. All enterprise data from the same enterprise will be encrypted using the same enterprise key. In these examples, the metadata stored with the data or file system lists may contain information regarding which enterprise a particular piece of data is associated with.

In some examples, the communication device may be configured to generate and use a unique enterprise encryption key for each service through which it receives enterprise data. All enterprise data received using the same service will be encrypted using the same enterprise key. In these examples, the metadata stored with the data or file system lists may contain information regarding which service or enterprise key a particular piece of data is associated with.

Figure 4:
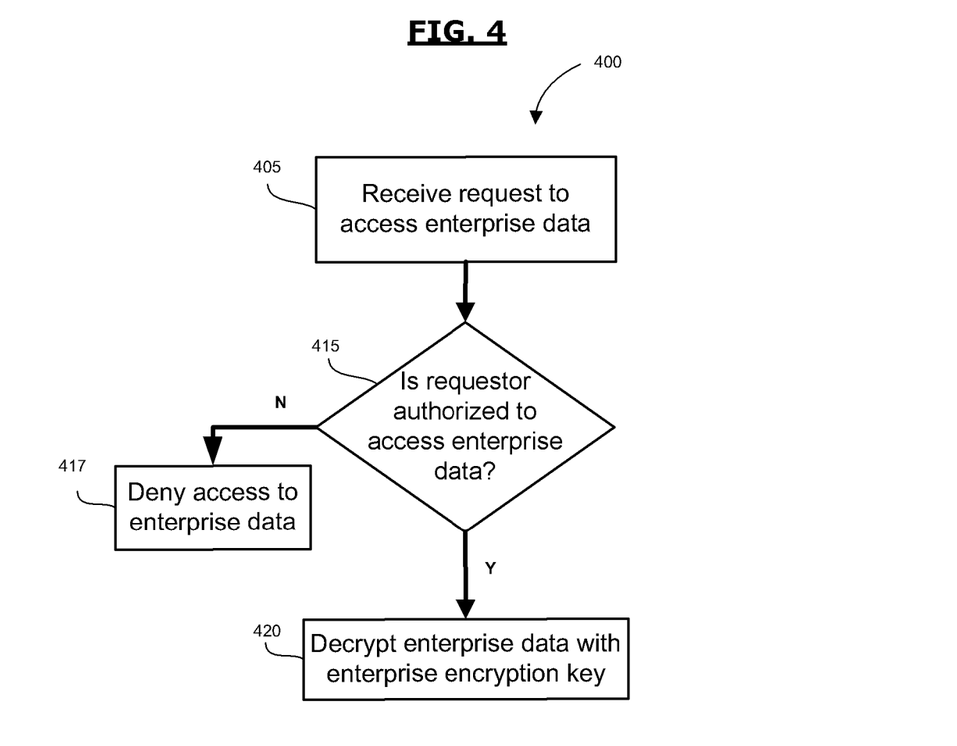
FIG. 4 shows, in flowchart form, another example method for securing data of a communications device.

Reference is now made to FIG. 4, which illustrates events which may occur after the events in FIG. 3. The method 400 begins at event 405 with an application 225 or service on the communication device requesting access to enterprise data 289 stored on the device. In some examples, the enterprise data subsystem recognizes the access request to be a request for enterprise data based on metadata stored with the enterprise data such as, for example, a file header indicating that the data is enterprise data. In other examples, where the file system maintains a list of stored enterprise data, upon receiving the access request, the file system will determine whether the requested data is on the enterprise data list.

Upon determining that the data request constitutes a request to access enterprise data, at event 415, the enterprise data subsystem 299 determines whether the requestor is authorized to access the enterprise data. In one example, the enterprise data subsystem 299 makes this determination based on whether the requesting application is on an access list. In this example, any applications or services on the access list are authorized to access the enterprise data and any applications or services not on the access list are not authorized to access the enterprise data. The services may be identified by a suitable service identifier or SID.

In another example in which applications utilize services to manage their communication channels, the enterprise data subsystem 299 will determine whether the requestor is authorized to access the enterprise data based on whether the requesting service is on an access list. In this example, any services on the access list are authorized to access the enterprise data and any services not on the access list are not authorized to access the enterprise data.

In other examples, the determination of whether the requestor is authorized to access the enterprise data may be based on a combination of the application and the service requesting access. In one example, the requestor will only be authorized to access the enterprise data if the application is on an access list, and the service is on an access list. In another example, the requestor will be authorized to access the enterprise data if the requesting application is on an access list regardless of the requesting service, or if the requesting application is not on an access list, the requestor will still be authorized to access the enterprise data if the requesting service is on an access list. Other permutations and combinations are possible and are contemplated in example embodiments. In further examples, the requestor may be unauthorized if the requesting application or service appears on an access blacklist.

Access lists may store application or service identification numbers or names or any other identifiers used by the operating system. These identifiers can be compared to the identifiers of the requesting application or service to determine whether it is on the access list and is thereby authorized to access enterprise data.

In the above examples, the access lists will generally be set by an enterprise network administrator either manually or during provisioning of the communication device. During provisioning, preset access lists may be downloaded from the enterprise network to the communication device. The access lists can be stored in non-volatile memory on the device and can be protected to prevent unauthorized editing or access.

In general, the access lists will be created to control access and dissemination of enterprise data. Applications that may potentially upload or share data to public servers or devices will likely not be allowed access to enterprise data. However, this may be up to the discretion and control of a network administrator.

In examples where the communication device is configured to communicate with multiple enterprise networks, the communication device may have a different set of access lists for each different enterprise. Any request to access enterprise data will refer to the respective enterprise's access list to determine whether the request is authorized to access the data.

For example, applications which only read data and cannot modify or transmit the data may be suitable applications for an access list. In this example, or any other examples described herein, event 415 may further require verification of the identity of a user of the mobile device such as by entering a password. This would further ensure that the enterprise data is not being accessed by an unauthorized individual.

For applications that may modify the enterprise data, an enterprise network administrator may only include data modifying applications on the access list if they comply with enterprise standards. Modified enterprise data or copies of enterprise data would also be encrypted and stored as enterprise data on the communication device.

Applications that may potentially transmit enterprise data to another device or server will likely require more careful scrutiny. For example, a web browser is generally able to communicate with countless servers on the internet and would probably be inappropriate to include the entire application on an access list. However, an enterprise network administrator may allow specific web browser services to access enterprise data stored on the device. For example, services used by the web browser to connect to an enterprise intranet, to access an enterprise web email server, or to access an enterprise file transfer protocol (FTP) server may be included in an access list, while services allowing for the upload of data to public servers or public email services would generally not be included or may be explicitly included in a blacklist. These are some examples of applications or services which may be implemented from the device when unlocked.

For example, some mobile devices including an email application which can access both an enterprise email service and web-based personal email service within a same interface or application. In some example embodiments, an an email or attachment thereof (e.g. company presentation) may be received and designated as enterprise application data. In some example embodiments, such application data may not be accessible or decrypted when forwarding or sending to the web-based personal email service. In other words, in some example embodiments the web-based personal email service would not be authorized to access and decrypt the encrypted e-mail or attachment.

If at event 415 the enterprise data subsystem 299 determines that the requesting application or service is not authorized to access the enterprise data, at event 417, the requesting application or service is denied access to the enterprise data.

The enterprise data remains encrypted and is thereby not readable by the requesting application. In some examples, the requesting application may be sent an error message or another indicator indicating that it is unauthorized to access to the requested data. It may be appreciated that by performing selective decryption, processor resources may be saved by not attempting to automatically perform decryption, for example for large media files.

If at event 415 the enterprise data subsystem 299 determines that the requesting application or service is authorized to access the enterprise data, at event 420, the enterprise data is decrypted using the enterprise encryption key, and access to the data is permitted.

Figure 5:
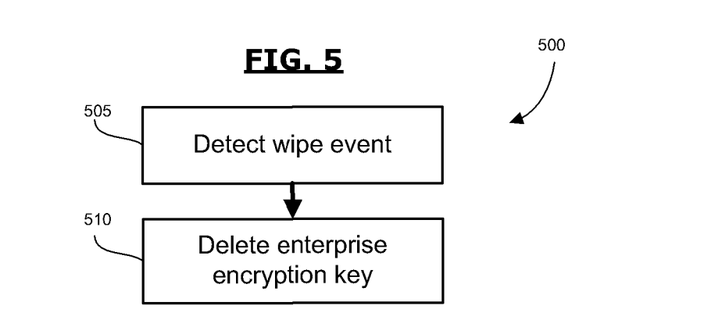
FIG. 5 shows, in flowchart form, another example method for securing data of a communications device.

Reference is now made to FIG. 5, which illustrates events which may occur after the events in FIG. 3. After an enterprise server on an enterprise network has sent enterprise data to a communication device, a network administrator may learn that the communication device has been lost, stolen, or that the owner of the communication device is no longer authorized to access the enterprise data. In order to deny future access to the enterprise data stored on the communication device, a server on the enterprise network sends a wipe message to the communication device.

At event 505, a wipe event is detected by the communication device. In one example, the wipe event may be receipt of a wipe message. This message may be in the form of an email message, a text message, or a message using any other protocol.

In other examples, the communication device may be configured to trigger a wipe event even when the device is not in communication with the server. In these examples, wipe events may be triggered when a predetermined condition is present. These predetermined conditions may be configured by an administrator manually, or automatically during provisioning of the device.

In one example, the communication device may be configured to detect a wipe event when a maximum number of incorrect password attempts have occurred.

In another example, the communication device may be configured to communicate or check in with a server at periodic intervals. The communication may be configured to detect a wipe event if the communication device fails to communicate with the server after a predetermined period of time.

In yet another example, the communication device may be configured to detect a wipe event when a low battery condition is detected on the communication device.

The enterprise data subsystem or other software module on the device is configured to detect wipe events, and upon detection of the wipe event, at event 510, delete one or more enterprise encryption keys associated with the enterprise.

Without the enterprise encryption key, all enterprise data encrypted with that key becomes inaccessible thereby preventing future access. Accordingly, it would be appreciated that non-enterprise data, e.g. personal data, remains accessible or encrypted by an unrelated key, as appropriate. Accordingly, it may be appreciated that a single removable memory card 230 may be used for both enterprise and non-enterprise data, wherein the key for the enterprise data may be selectively deleted, rendering the associated data inaccessible.

In some example embodiments, upon detection of a wipe event, the enterprise data subsystem or other software module on the device may also be configured to delete enterprise data associated with the enterprise.

In examples where the communication device is configured to encrypt and store data from more than one enterprise, receipt of a wipe message will only delete the encryption keys associated with the enterprise that sent the wipe message. Accordingly, it may be appreciated that a single removable memory card 230 may be used for more than one enterprise server or organization, wherein the encryption key relating to enterprise data for a particular enterprise server can be selectively deleted, while the remaining data remains accessible or encrypted by an unrelated key, as appropriate.

In examples where the communication device is configured to encrypt different enterprise data files with different encryption keys, a wipe message may cause the communication device to delete all encryption keys associated with the enterprise, or it may cause the communication device to delete a subset of the encryption keys associated with the enterprise. For example, if an enterprise has sent a time sensitive document to a communication device and the document has expired, or an enterprise would like to retract a document sent to a communication device, a wipe message could cause the communication device to delete the encryption key for the specific document.

In the above examples, the communication device may also be configured to delete the encrypted data associated with the deleted encryption keys.

To facilitate the sending of wipe messages and to control enterprise data sent to various communication devices, an enterprise server may maintain a list or database of communication devices to which enterprise data has been sent. This list may be stored in a memory accessible by the enterprise server.

It may be appreciated that some example embodiments may be used as an addition or enhancement to some general media card encryption systems which may use their own set of longstanding keys. For example, in order to implement some example embodiments: 1) A unique, device-specific key may be generated and is used to encrypt enterprise data written to a media card. This may be done regardless of whether general media card encryption has been turned on; 2) In the case where general media card encryption has been turned on, personal data may be encrypted with a key that is different from the one used to encrypt enterprise data. In the case where general media card encryption is turned off, personal data may be written unencrypted; and 3) Read access and decryption to enterprise data stored on media cards may be restricted only to those applications and services that are allowed to access enterprise data, for example as defined by the administrator. For example, in example embodiments attempts to read a file containing enterprise data may result in performing additional checks prior to attempting to decrypt.

While some of the present embodiments are described in terms of methods, a person of ordinary skill in the art will understand that present embodiments are also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. A method of securing data of a mobile communications device, the method comprising:
generating, at the mobile communications device, an encryption key using at least information specific to the mobile communications device, wherein the encryption key is specific to the mobile communications device and unknown to other devices including a first server, wherein the encryption key is a private encryption key for both encryption and decryption;
storing the encryption key in the mobile communications device, wherein the encryption key is not exportable from the mobile communications device;
determining, at the mobile communications device, in response to installation or removal of a file manager application, that first application data is data received from or for sending to the first server;
in response to determining that the first application data is data received from or for sending to the first server, encrypting the first application data with the encryption key stored in the mobile communications device;
storing the encrypted first application data on a memory;
receiving, after storing the encrypted first application data, a request to access the first application data from a second application or a service on the mobile communications device;
determining that the second application or service is authorized to access data associated with the first server; and
in response to determining that the second application or service is authorized to access data associated with the first server, decrypting the first application data with the encryption key.

2. The method of claim 1 further comprising:
detecting a wipe event from the first server; and
upon said detecting of the wipe event, deleting the encryption key.

3. The method of claim 2 further comprising, upon said detecting of the wipe event, deleting the encrypted first application data.

4. The method of claim 1 wherein the memory is a removable memory.

5. The method of claim 1 wherein determining whether the second application or service is authorized comprises determining whether the second application or service is on an access list.

6. The method of claim 1 wherein determining whether the second application or service is authorized is performed by a file system module of the mobile communications device.

7. The method of claim 1 further comprising verifying a user's identity before decrypting the first application data.

8. The method of claim 1 further comprising:
generating, at the communication device, header or file extension information for the first application data, indicating that the first application data is data associated with the first server.

9. The method of claim 1 further comprising:
receiving second application data on the mobile communications device;
determining the second application data is data associated with a second server;
encrypting the second application data with a second encryption key stored in the mobile communications device; and
storing the encrypted second application data on the memory.

10. The method of claim 1 wherein determining the first application data is data received from or for sending to the first server is further based on an indication that the first application data is received from or for sending to the first server.

11. The method of claim 1 wherein storing the encrypted first application data includes storing a server indicator with the encrypted first application data.

12. The method of claim 1 wherein storing the encryption key includes securing the encryption key.

13. The method of claim 1 wherein the first server comprises an enterprise server and wherein said determining that the first application data is data from the first server includes further determining that the first application data is enterprise data.

14. The method of claim 1 further comprising, in response to determining that the encryption key has not yet been generated, the mobile communications device generating the encryption key using at least information specific to the mobile communications device.

15. The method of claim 1 wherein the encryption key is generated by the mobile communications device using a hash function using at least information specific to the mobile communications device.

16. The method of claim 1 wherein the information specific to the mobile communications device comprises a random or pseudorandom number generated by the mobile communications device.

17. A mobile communications device comprising:
a processor;
memory; and
a communication subsystem for sending and receiving communications with a server;
the processor being configured for
generating an encryption key using at least information specific to the mobile communications device, wherein the encryption key is specific to the mobile communications device and unknown to other devices including the server, wherein the encryption key is a private encryption key for both encryption and decryption;
storing the encryption key in the mobile communications device, wherein the encryption key is not exportable from the mobile communications device;
determining, in response to installation or removal of a file manager application, that application data is data received from or for sending to the server;
in response to determining that the application data is data received from or for sending to the server, encrypting the application data with the encryption key stored in the mobile communications device;
storing the encrypted application data in the memory;
receiving, after storing the encrypted application data, a request to access the encrypted application data by a second application or a service on the device;
determining that the second application or service is authorized to access the encrypted application data; and
in response to determining that the second application or service is authorized to access data associated with the server, decrypting the application data.

18. The mobile communications device of claim 17 wherein when a wipe event is detected, the processor is configured to delete the encryption key.

19. The mobile communications device of claim 18 wherein when the wipe event is detected, the processor is further configured to delete the encrypted application data stored in the memory.

20. The mobile communications device of claim 17 wherein the memory is a removable memory.

21. The mobile communications device of claim 17 wherein the processor is further configured for determining whether the second application or service is authorized to access the encrypted application data based on an access list stored in the mobile communications device.

22. The mobile communications device of claim 21 wherein the processor includes a file system module configured for determining whether the second application or service is authorized to access the encrypted application data.

23. The mobile communications device of claim 17 wherein the processor is further configured for generating header or file extension information for the application data, indicating that the application data is data associated with the server.

24. The mobile communications device of claim 17 wherein the processor is configured for distinguishing between application data associated with a first server and data associated with a second server.

25. The mobile communications device of claim 24 wherein if first application data is received by the communication subsystem, the processor is configured for determining whether the first application data is associated with the first server or the second server based on an indication that the first application data was received via or is for sending to the first server or the second server.

26. The mobile communications device of claim 24 wherein the processor is configured for distinguishing between application data associated with the first server and application data associated with the second server based on stored header or metadata information.

27. The mobile communications device of claim 17 wherein the processor is further configured for verifying a user's identity before decrypting the encrypted application data.

28. A non-transitory computer readable medium having instructions stored thereon for securing data of a mobile communications device, the instructions comprising instructions for:
generating, at the mobile communications device, an encryption key using at least information specific to the mobile communications device, wherein the encryption key is specific to the mobile communications device and unknown to other devices including a first server, wherein the encryption key is a private encryption key for both encryption and decryption;
storing the encryption key in the mobile communications device, wherein the encryption key is not exportable from the mobile communications device;
determining, at the mobile communications device, in response to installation or removal of a file manager application, that first application data is data received from or for sending to the first server;
in response to determining that the first application data is data received from or for sending to the first server, encrypting the first application data with the encryption key stored in the mobile communications device;
storing the encrypted first application data on a memory;
receiving, after storing the encrypted first application data, a request to access the first application data from a second application or a service on the mobile communications device;
determining that the second application or service is authorized to access the data associated with the first server; and
in response to determining that the second application or service is authorized to access data associated with the first server, decrypting the first application data with the encryption key.

* * * * *